March 16, 1943. W. A. WEIGHTMAN 2,313,789
WELDING APPARATUS
Filed Dec. 7, 1940 5 Sheets-Sheet 1

INVENTOR
William A. Weightman
BY John P. Tarbox
ATTORNEY

March 16, 1943.  W. A. WEIGHTMAN  2,313,789
WELDING APPARATUS
Filed Dec. 7, 1940   5 Sheets-Sheet 2
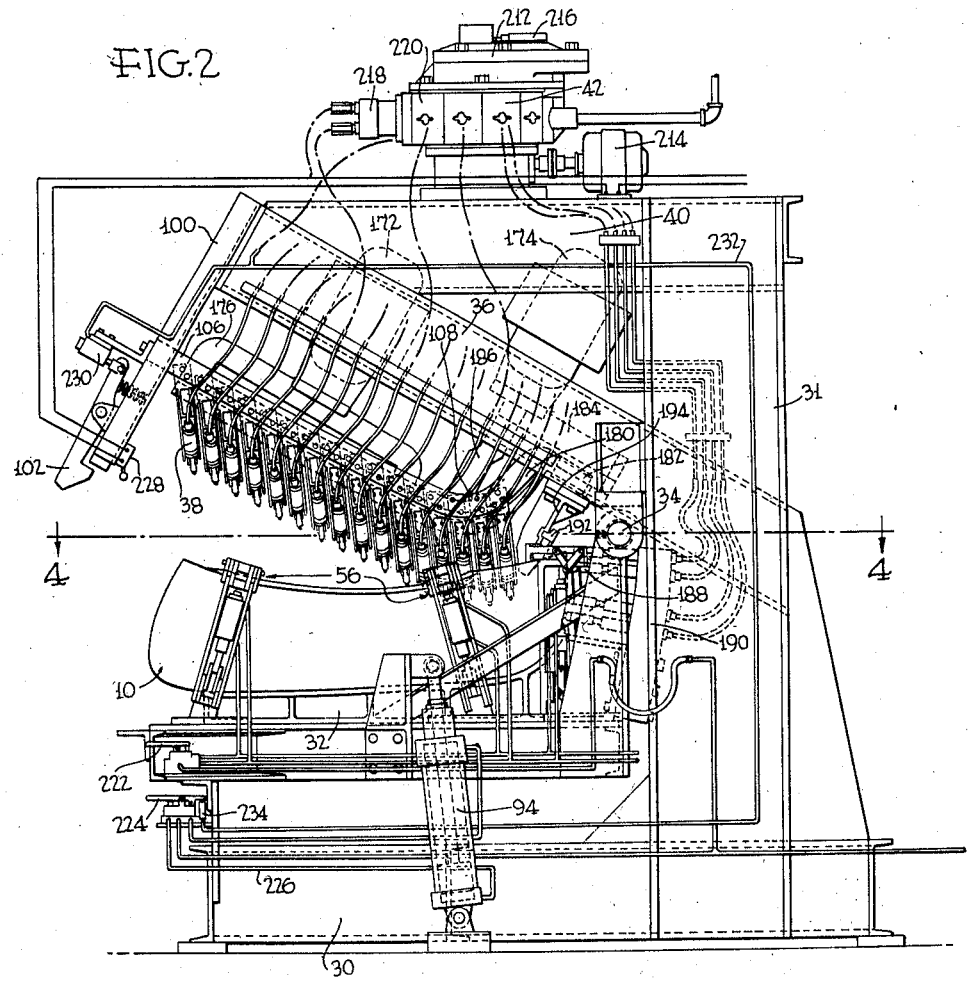
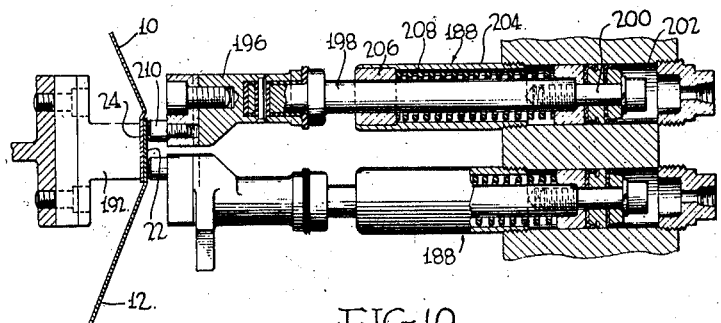
INVENTOR
William A. Weightman
BY John P. Tarbox
ATTORNEY March 16, 1943.   W. A. WEIGHTMAN   2,313,789
WELDING APPARATUS
Filed Dec. 7, 1940   5 Sheets-Sheet 3
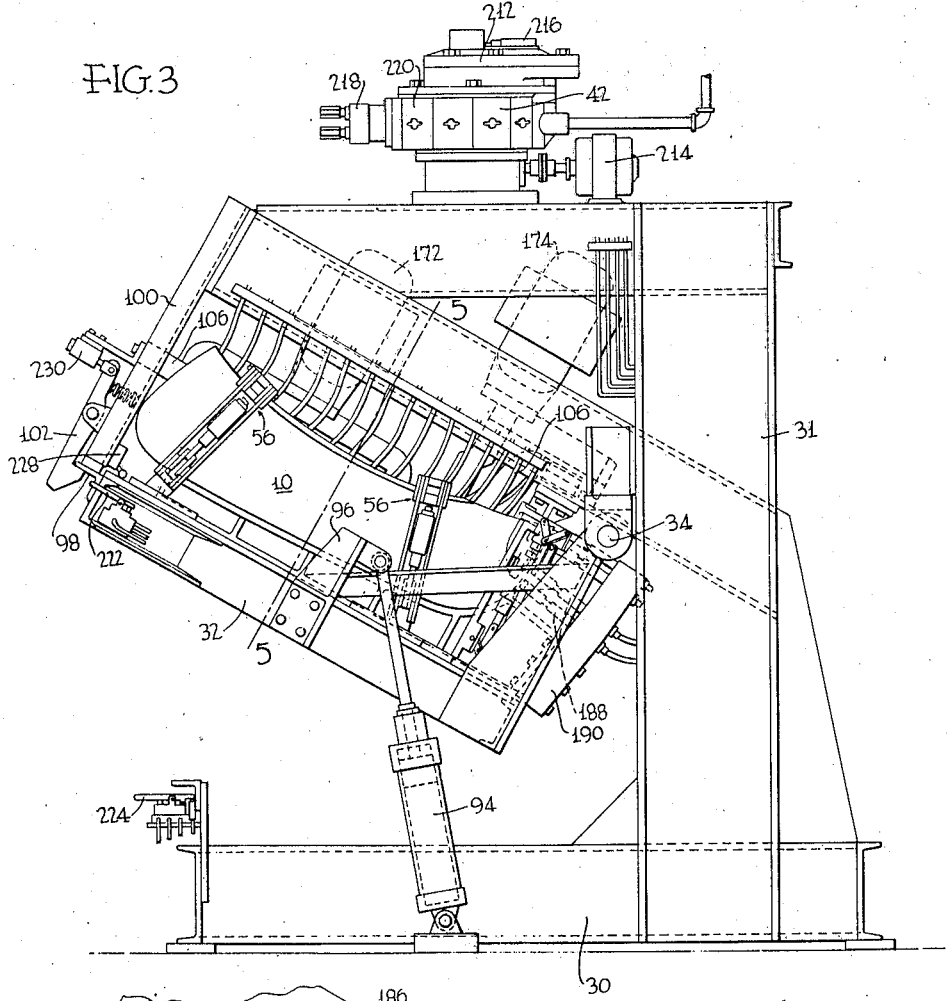
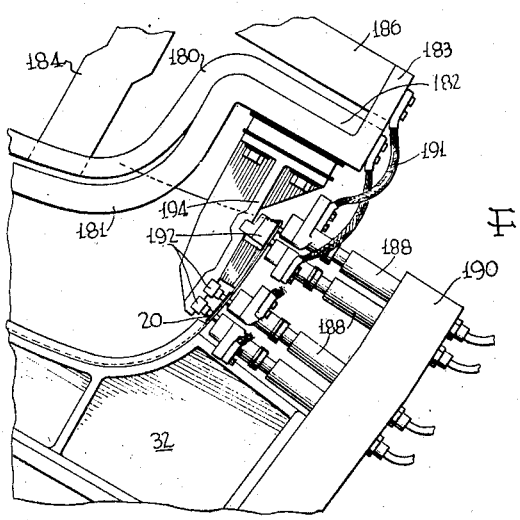
INVENTOR
William A. Weightman.
BY John P. Tarbox
ATTORNEY

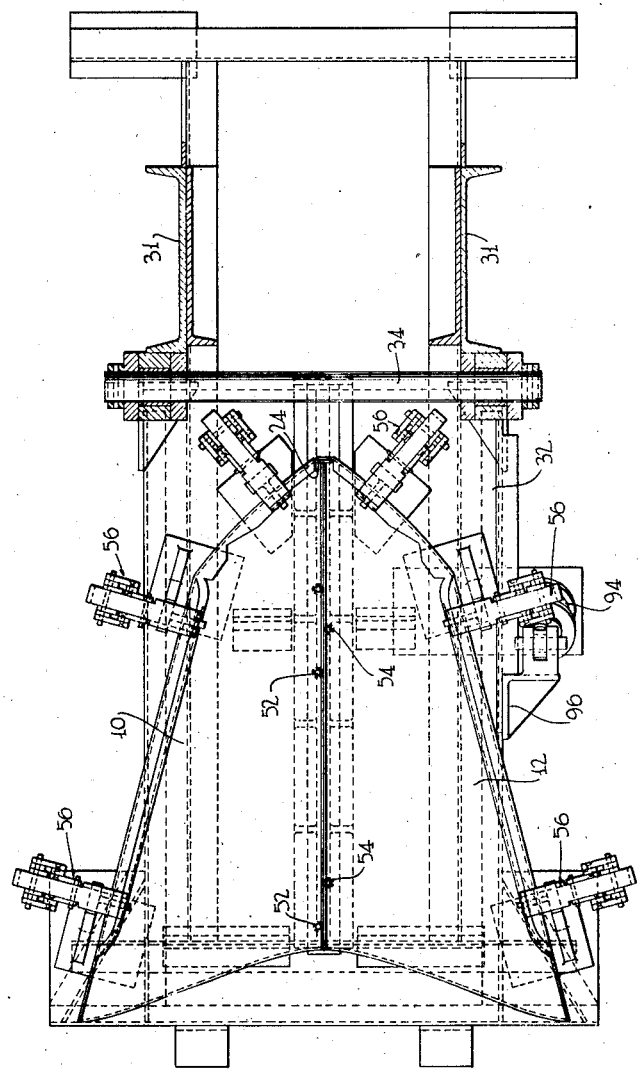

March 16, 1943.  W. A. WEIGHTMAN  2,313,789
WELDING APPARATUS
Filed Dec. 7, 1940  5 Sheets-Sheet 5
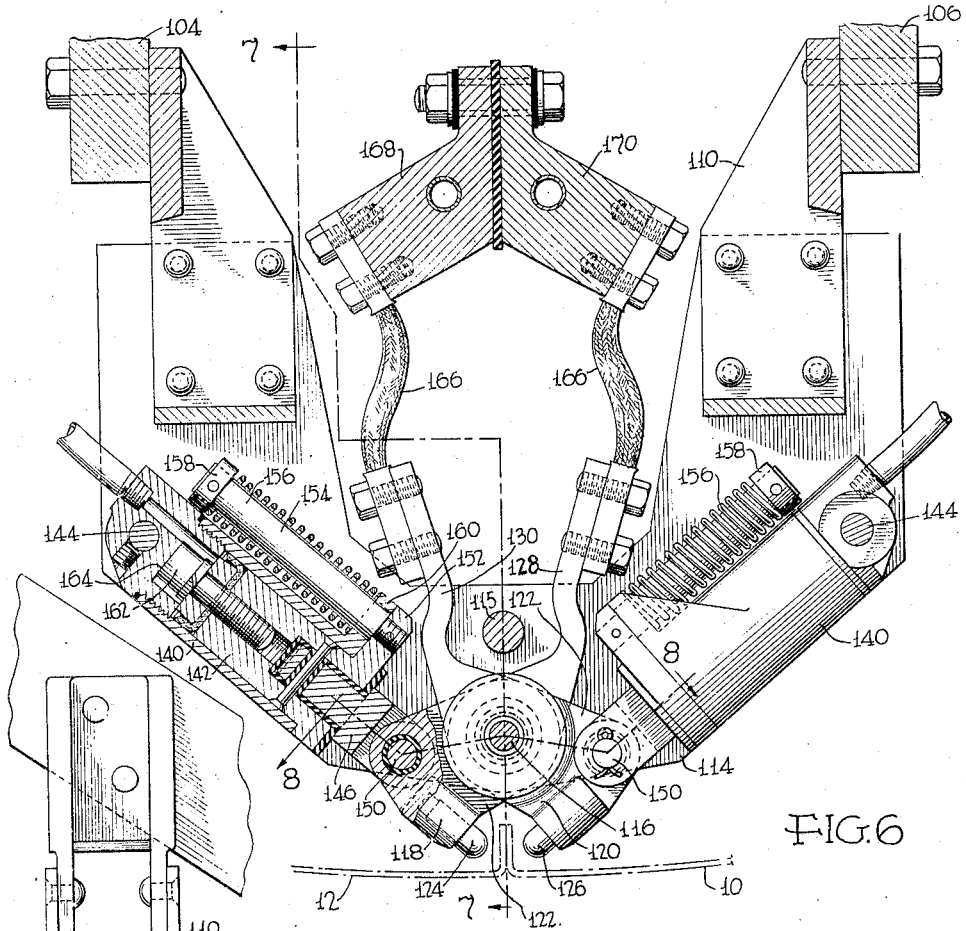
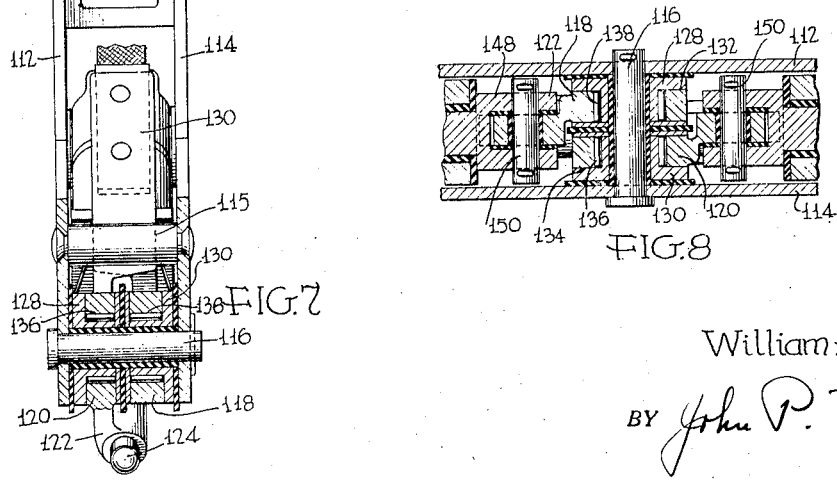
INVENTOR
William A. Weightman
BY John P. Tarbox
ATTORNEY Patented Mar. 16, 1943

2,313,789

UNITED STATES PATENT OFFICE 2,313,789

WELDING APPARATUS

William A. Weightman, Philadelphia, Pa., assignor to Edward G. Budd Manufacturing Co., Philadelphia, Pa., a corporation of Pennsylvania Application December 7, 1940, Serial No. 369,007

9 Claims. (Cl. 219—4)

This invention relates to multiple spot welding apparatus and more particularly to welding guns adapted for use in apparatus for effecting a large number of welds in workpieces of irregular shape at a high rate of speed.

In spot welding a flanged seam between adjacent members it is essential that a plurality of welds be arranged with relatively close spacing since the welds are generally in tension and a plurality are required for strength. Where such a seam is located within a concave curve a great amount of difficulty is encountered in providing a plurality of welding guns side by side and sufficiently closely spaced particularly in such curved portions since the guns ordinarily would interfere with one another. Also considerable difficulty is encountered in providing suitable mechanism for clamping the workpieces in welding position since the clamps must be clear of interference with the welding guns. In addition, such clamping mechanism must be capable of quickly securing and releasing workpieces to the end that upon the completion of a large number of welds at high speed the apparatus may be unloaded and loaded with a new set of workpieces in a minimum of time.

It is accordingly an object of the present invention to provide a series of closely spaced pairs of welding electrodes such that they may embrace adjacent flanges to effect closely spaced spot welds along the length thereof.

Another object of the invention is to provide such electrodes arranged at such an angle that they may project into a concave curved portion, the central electrode in the middle of the concave portion being substantially normal to the line of welds at the point.

A further object of the invention is to provide a novel work support so arranged with respect to a series of electrodes arranged along a line as to permit the swinging of a workpiece about a pivot into position with respect to the electrodes for welding.

Still another object of the invention is to provide novel clamping means for securing workpieces within a work holder such that the workpieces may be quickly clamped in place and quickly released upon completion of the welding operation.

A yet further object of the invention is to provide automatic sequential operation of such a welding apparatus such that upon loading the workpieces within the work holder, the same may be quickly moved to welding position, welds effected and thereafter quickly removed from the machine.

And still a further object of the invention is to provide a welding tool adapted for alignment with a plurality of other welding tools in stepped manner and in which the welding pressure is applied from opposite sides to pinch the welding electrodes against a pair of continuous flanges and in which current is distributed to all the electrodes from a common source immediately to the rear of the electrodes.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

Referring to the drawings wherein like reference characters indicate like parts:

Figure 2 is a side elevation of the apparatus adapted to effect a plurality of welds along a flanged seam as indicated in Figure 1, the machine being shown in loaded but not welding position.

Figure 3 is a side elevation of the apparatus illustrating the machine in welding position.

Figure 4 is a section taken substantially on the line 4—4 of Figure 2 illustrating the manner of loading the machine.

Figure 6 is an enlarged elevation of a welding gun parts of which are shown in section.

Figure 7 is a broken section through the axis of the welding gun of Figure 6 taken substantially on the line 7—7.

Figure 8 is a broken section taken through the pivots and axis of the gun of Figure 6 substantially on the line 8—8 of Figure 6.

Figure 9 is an enlarged fragmentary side elevation illustrating a plurality of welding guns in Figure 3 adapted to effect lap welds in the nose of the stamping at the upper right hand portion thereof, parts of the frame structure being removed and parts of the stampings being cut away to illustrate the detail.

Figure 10 is an enlarged top plan view of a pair of electrodes of Figure 9, parts of which are shown in section.

Figure 1:
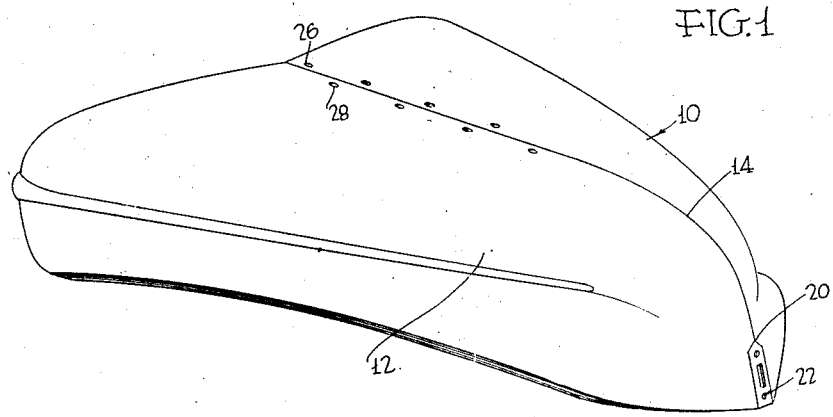
Figure 1 illustrates a pair of stampings joined together by a longitudinal seam formed by mating inside flanges.

Referring to Figure 1 there is illustrated a pair of stampings 10 and 12 having a longitudinal central seam 14 therebetween. The greater portion of the seam 14 is formed from a pair of mating flanges, (see Figure 5), 16 and 18 extending to the point 20 at the nose of the stampings at which point one stamping 12 has a portion 22 overlapping a portion 24 of the stamping 10 (see Figure 10). All along the length of the flanges 16 and 18 spot welds are to be effected at fairly uniformly spaced intervals and in the overlapped portions 22 and 24 in the nose a plurality of welds are to be effected to form a lap joint thereat. The stampings are also provided with a plurality of apertures 26, 28 adapted to engage pins in the work holder of the machine in order to secure the parts in proper juxtaposition for welding.

In the apparatus shown in Figure 2 there is a base 30 having an upright column 31 upon which is pivotally mounted a work support 32, the same being pivotally mounted upon the column 31 at 34. The work support 32 is adapted to receive and hold a pair of stampings 10 and 12 such as illustrated in Figure 1. Upon the upright 31 is arranged a diagonal frame member 36 from which are supported a plurality of welding guns 38 adapted to effect welds along the length of the seam formed by the flanges 16 and 18. A top framework 40 is provided adapted to brake the diagonal frame 36 and support a fluid pressure distributing unit 42 to supply fluid pressure sequentially to various guns or sets of guns.

Figure 5:
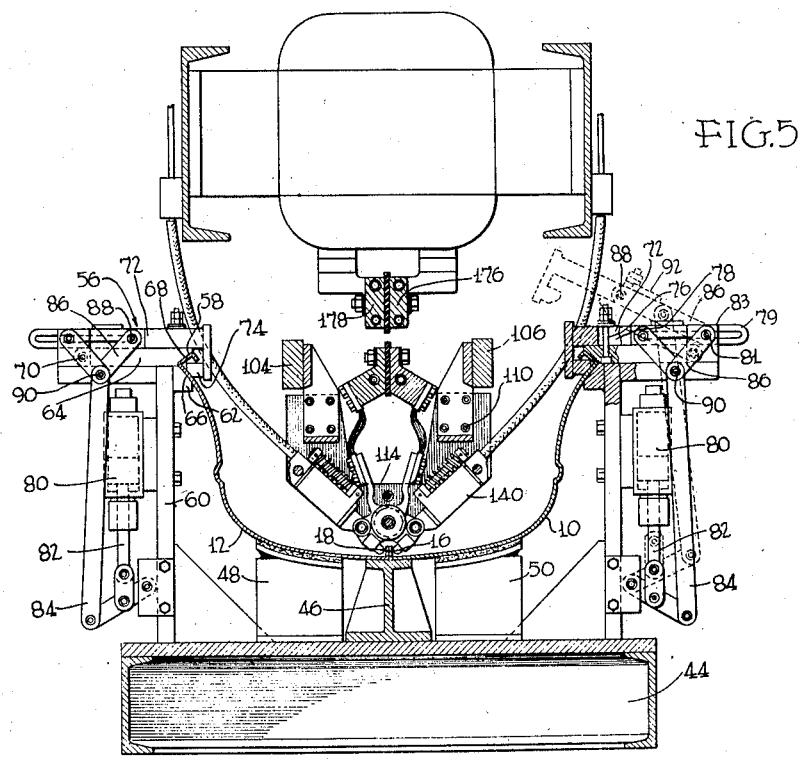
Figure 5 is a transverse section taken substantially on the line 5—5 of Figure 3, the section being transverse to the seam at the point where the section is taken except through the welding guns or substantially that portion which is shown enlarged in Figure 6 where the section is inclined.

The work support 32 comprises a base member 44 upon which is arranged a central I-beam rest 46 against which the members 12 and 10 and the seam flanges 16 and 18 are positioned during welding. In order to secure the workpieces in proper position, the I-beam rest 46 is provided with a series of pins 52 and 54 adapted to engage the apertures 28 in the stampings 10 and 12 so as to assure proper positioning of the parts. To hold the stampings in position after having been properly placed in the work support, a plurality of clamps 56 are provided, the clamps being operated by fluid pressure and being adapted to grip the marginal flange 58 of the stampings 10 and 12. Each of the clamps comprises an upright 60 having abutments 62 and 64 at the top thereof for receiving the marginal flange 58. The abutment 62 is rigidly secured to the upright 60 and has a face 66 especially shaped to receive the workpiece 12. The abutment member 64 likewise is provided with a face 68 to engage the marginal flange of the workpiece 12 and is pivoted upon the abutment member 62 at the point 70 as indicated. In order to positively hold the marginal flange of the workpiece 12 in proper engagement with the abutment members 62 and 64 and the faces 66 and 68 thereon, a clamping member 72 is provided, the same being slidably secured upon the pivotal abutment member 64. The clamping member 72 has an overhanging abutment 74 adapted to engage the workpiece 12 from the opposite side of the abutment faces 66 and 68 near the marginal flange so that when the member 72 is slid upon the abutment member 64 to the position shown in Figure 5, the workpiece 12 is positively secured in position and against any possible movement. As indicated in Figure 5 the sliding movement of the member 72 upon the member 64 is arranged for through the bolt 76 extending through the slot 78 in the member 72 and by reason of the slotted tail portion 79 of the member 72 through which a pin 81 extends, the pin being secured in upstanding ears 83 on the abutment block 64 on either side of the tail portion 79.

In order to operate the clamping mechanism a fluid pressure cylinder 80 is secured to the upright member 60, the fluid pressure cylinder acting through a piston 82 upon a linkage 84 and toggle mechanism 86, the latter of which is pivoted at one end upon the pin 81 and at the other end upon a pin 88 in the sliding member 72. Thus upon exerting a force upon the knee 90 of the toggle through the linkage 84 the toggle is caused to straighten out to the position indicated in dotted lines in Figure 5, sliding the clamping member 72 away from the marginal flange of the workpiece 12 and thereafter urging both the abutment member 64 and the slidable clamping member 72 angularly upward and out of the way so as to permit free unloading or loading of the work support. To limit the movement of the toggle when in the straightened out position, a stop 92 is provided on the slidable member 72 which is adapted to engage the toggle when in its straight position. It will thus appear that by admitting fluid pressure to the upper end of the cylinder the piston is driven downward, the toggle caused to bend and the clamping member 72 caused to slide so as to secure the marginal flange of a workpiece tightly into engagement with the abutment faces 66 and 68. On the other hand, admission of fluid pressure to the lower end of the cylinder raises the piston and causes the release of the marginal flange of the workpiece through the lifting of the abutment face 68 as well as the clamping member 72.

The work support 32, as is illustrated in Figure 3, is adapted to be lifted around its pivot point 34 upward into an angular position so as to bring the workpieces and the flanges which are adapted to form the seam between the workpieces into position with respect to the welding electrodes 38. Such movement of the work support is effected through fluid pressure motors 94 acting between the base member 30 of the frame and lugs 96 upon the work support 32. When lifted into proper position, the outer end 98 of the work support 32 is adapted to engage a latch abutment member 100 depending from the frame 36, the abutment member carrying thereon a fluid pressure operated latch 102 adapted to engage the end 98 of the work support 32 so as to retain the same in elevated position during the welding operation.

The welding guns 38 are supported from a pair of spaced bars 104 and 106 extending from the frame 36 to the abutment member 100 and are provided with suitable curvature as at 108 so that the welding guns mounted thereon will be adapted to engage the curved flanges 16 and 18 of the workpieces 10 and 12. The guns 38 are substantially identical and are supported from the bars 104 and 106 upon a general U-shaped depending bracket 110, the lower portion of which is composed of spaced members 112 and 114 having a spacer 115 between which the moving parts of the welding gun are positioned. At the lower end of the U there is provided a pivot pin 116 extending between the members 112 and 114 and upon which are pivotally arranged the welding electrode holders 118 and 120, the electrode holders being nested upon the pin, and insulated therefrom and from one another. Each of the electrode holders has an arm portion 122 suitably offset so that the side by side position of the electrode holders upon the pin 116 is compensated for and the electrodes 124 and 126 positioned in suitable alignment. Also mounted upon the pin 116 (see Figures 7 and 8) are electrical connecting members 128 and 130, the same being adapted to abut against the electrode holding members 118 and 120 upon the planes of contact 132 and 134. At the same time, a sleeve extension of each of the connecting members 128 and 130 together with bearing rollers 136 and 138 provide an anti-friction bearing for the welding electrode holder members 118 and 120. Actuation of each of the welding electrodes is accomplished through the operation of a fluid pressure cylinder 140 having a piston 142 therein, the cylinder being pivoted upon a pin 144 extending between the members 112 and 114 and the piston having an insulated extension 146 with a forked end pivoted to each of the welding electrode holder members 118 and 120 through a pin 150. The piston is provided with a radially extending lug 152 to which is secured a shouldered pin 154 extending parallel with the axis of the cylinder. Arranged upon the pin 154 is a return spring 156 compressed between the shoulder 158 on the pin 154 and a lug 160 on the cylinder through which the pin 154 slidably extends. Return movement of the piston 142 is limited by a stop 162 arranged in the end of the piston 142 and adapted to abut the cylinder head 164.

Electrical connections are made to the contact members 130 and 128 through the flexible connections 166 to the water cooled bus bars 168 and 170, the latter extending parallel with the bars 104 immediately above the welding electrodes. Two transformers 172 and 174 are arranged in the frame 36, one of which supplies the first eleven guns from the left-hand side of the machine as seen in Figure 2, the bus bars 168 and 170 being broken between the eleventh and twelfth gun and connected to the transformer 172 through connecting bars 176 and 178, the bars 176 and 178 being connected to the bus bars 168 and 170 at their opposite ends so that equal electrical paths of flow of welding current to any pair of guns from the transformer are provided. The other transformer 174 is connected through a similar pair of bus bars 180 and 181 extending from the twelfth welding electrode around the curve and terminating at their ends at 182 and 183. Opposite ends of these bus bars are connected to the transformer 174 through connecting conductors 184 and 186.

In order to effect a plurality of lap welds in the nose of the workpiece formed by the stampings 10 and 12, a plurality of welding electrodes 188, eight in number as is illustrated, are mounted upon a supporting member 190 carried by the work support. These electrodes are connected by flexible jumpers 191 to the ends of the bus bars 182 and 183, the guns being paired, one gun being connected to one bar and an adjacent gun being connected to the other bar. To effect welds through these guns, two welds are made in series. For this purpose, conducting bridging blocks 192 are supported from the frame 36 upon a bracket 194 and are adapted to substantially fit the internal contour of the lapped portions 22 and 24 of the workpieces 10 and 12 when the work holder is in elevated position as illustrated in Figures 3 and 9.

As will be seen in Figure 10, each of the welding electrodes 188 is composed of an electrode tip holder 196 insulatingly mounted upon a piston rod 198 having a piston 200 thereon acting in a cylinder bore 202 in the supporting member 190. An extending sleeve 204 threadedly secured in the bore 202 is provided together with a bearing block 206 for the purpose of accurately guiding the movement of the welding electrode as well as housing a return spring 208 within the sleeve and around the rod 198, the spring bearing against the block 206 and the piston 200. Since it is desirable that the electrode tips 210 be offset from the center in order to effect welds extremely close together, relative rotation between the rod 198 and cylinder bore 202 is preferably prevented in any suitable manner as by a key between the block 206 and the rod 198, not shown however.

The welding electrodes, therefore, will appear to be arranged in two groups, one group being fed from the transformer 172 and the other group from the transformer 174. All of the welding guns of one group are permanently connected as will be appreciated across the bus bars and to the transformer. In order to effect a sequential operation of the welding guns, a fluid pressure distributor valve 212 is provided, the same being driven by a motor 214 and being adapted to supply fluid pressure sequentially to the various welding guns. With the distribution of fluid pressure to each gun welding current is supplied to the welding transformers by means of a synchronized welding current control switch 216 also driven by the motor 214, welding current being applied to the bus bars each time that a welding gun is supplied with fluid pressure from the distributor valve 212. The distributor valve is composed of a casing as shown having secured around its exterior a plurality of valves such as 218, which valves are bolted to seats 220 on the casing, the valves being removed from a number of the seats in order to more clearly illustrate the invention. The particular structure of the distributor valve does not form a part of the present invention but may have the same functional operation as that illustrated in my copending application Serial No. 143,600, filed May 19, 1937, now Patent No. 2,229,993, January 28, 1941. It will be appreciated that each of the valves 218 is connected to the cylinders 140 of a welding gun 38 or to a pair of cylinders 202 of the welding electrodes 188. If desired, one valve may supply fluid pressure to a welding gun of the group supplied with current from the welding transformer 172 and simultaneously to a welding gun or pair of electrodes supplied with welding current from the transformer 174. By thus using a common valve for both groups, the entire set of welds are effected in the time of operation of a single group and if the welds are made at a rate not greater than one per second, a complete set of welds will be completed in the course of eleven seconds.

The operation of the apparatus is to a large extent automatic. Upon the placing of a pair of workpieces 10 and 12 in the work holder, a manual valve 222 is operated to supply fluid pressure to the upper end of the cylinders 80 so as to cause the fluid pressure operated clamps to grip and securely hold the work in place. Thereafter, the manual valve 224 may be operated to supply fluid pressure through the pipe line 226 to the work holder elevating cylinders 94, thus raising the work support into the position shown in Figure 3. Upon the work holder arriving in welding position, the work holder engages a limit switch 228 which immediately energizes the motor 214 setting the distributor valve 212 into operation. The welds are thereupon sequentially effected and upon completion of the last weld, the distributor switch moves to a valve such as 218, which supplies fluid pressure to a latch actuating motor 230 opening the latch 102 and at the same time, supplying fluid pressure to the pipe line 232 to the valve operating motor 234 associated with the manual valve 224 so as to supply fluid pressure to the upper end of the work elevating cylinders 94 to thereupon lower the work. At the same time the motor 214 is cut off and the distributor valve thereby stopped. Release of the workpieces is then effected through the operation of the manual valve 222 which supplies fluid pressure to the underside of the piston in the fluid pressure motor 80 to release the clamps thereby permitting removal of the workpieces.

There is thus provided a multiple spot welding apparatus capable of effecting a plurality of closely spaced welds along a flanged seam at a rapid rate, and in which rapid loading and unloading of the workpieces is provided for. Further the apparatus is such as is adapted to reach into relatively close quarters as where the seam extends along the inside of a concavity.

Though a single embodiment of the invention has been illustrated and described, it is to be understood that the invention is not limited thereto, but may be embodied in various mechanical forms and combinations as may be desired. As various changes in construction and arrangement of parts may be made without departing from the spirit of the invention, as will be apparent to those skilled in the art, reference will be had to the appended claims for a definition of the limits of the invention.

While the appended claims are outstandingly directed to the individual welding guns, other features of the invention constitute the subject matter of the inventor's application Serial No. 418,477 for "Welding apparatus," filed November 10, 1941, as a division of the present application.

What is claimed is:

1. A welding gun adapted for arrangement with other closely spaced similar guns, said gun comprising a pair of spaced parallel plates, a pair of welding electrode supporting brackets being pivotally connected to and between said plates, said brackets having interacting welding electrodes located beyond the edges of said plates, a fluid pressure cylinder and piston for each of said electrodes, said cylinders being pivoted on pins extending transversely between said plates and a pivot upon each of said welding electrodes connected with one of said pistons.

2. In a welding gun, a pair of substantially parallel plates, a pair of pivot pins extending transversely to and between said plates at a definite distance, a welding electrode pivotally carried between said plates on one of said pins having its electrode tip located beyond the adjacent edges of said plates, a motor comprising two members telescopingly extensible with respect to each other, one of said members being pivoted to said plates by the other of said pins and the second member having pivotal connection to said welding electrode.

3. In a welding gun a pair of relatively closely spaced substantially parallel plates, a pivot pin extending transversely through said plates, a pair of electrically conductive members insulated from one another and from the pin, mounted upon said pin and arranged side by side, said electrically conductive members having as a part thereof a cylindrical bearing surface, a pair of welding electrodes pivotally mounted upon each of said electrically conductive members about said cylindrical bearing surface.

4. In a welding gun a pair of relatively closely spaced substantially parallel plates, a pivot pin extending transversely through said plates, a pair of electrically conductive members insulated from one another and from the pin, mounted upon said pin and arranged side by side, each of said electrically conductive members having a cylindrical bearing surface and a radial flange forming a contact face, a welding electrode pivotally mounted upon each electrically conductive member about said cylindrical bearing portion, said welding electrode having a radial contact face adapted to engage the face of its respective electrically conductive member.

5. A welding gun comprising a support, a pivot pin on said support, a pair of coaxial sleeves mounted upon said pivot pin and being insulated from said pin and from each other, said sleeves being electrically conductive, and a pair of electrode members, one electrode member being pivoted upon one of said sleeves and the other electrode member being pivoted upon the other of said sleeves, said electrode members being insulated from each other, each sleeve and the electrode pivoted thereon being in electrical engagement.

6. A welding gun comprising a support, a pivot pin on said support, a pair of coaxial sleeves mounted upon said pivot pin and being insulated from said pin and from each other, said sleeves being electrically conductive, and a pair of electrode members, one electrode member being pivoted upon one of said sleeves and the other electrode member being pivoted upon the other of said sleeves, said electrode members being insulated from each other, each sleeve having a circumferential flange in electrical end bearing engagement with the electrode pivoted thereon.

7. In a welding gun, a support, a pair of welding electrodes pivoted to said support for pivotal movement toward and away from each other, electrode actuating means for each of said electrodes, each actuating means including two elements, movable with respect to each other, one of said elements being pivoted to the adjacent electrode and the other of said elements being pivoted to said support, and means for supplying energy to said actuating means for forcibly moving said elements in a direction away from one another so as to exert a pressure on the electrodes.

8. In a welding gun having an electrode, a substantially rigid support, a pivot connection between said support and said electrode, electrode actuating means comprising two members telescopingly guided with respect to each other, the one member being pivoted to said support, said other member having an extension secured thereto and electrically insulated therefrom, and a pivot connection between said extension and electrode at a point spaced from the pivot connection between said electrode and said support.

9. In a welding gun support, a pair of welding electrodes pivoted to said support for pivotal movement to and from each other, electrode actuating means for each of said electrodes, each actuating means comprising a motor secured to said support and operative to move one of said electrodes toward the other.

WILLIAM A. WEIGHTMAN.